United States Patent [19]

Katsuma et al.

[11] Patent Number: 4,502,771
[45] Date of Patent: Mar. 5, 1985

[54] CAMERA WITH A VOICE TRANSMITTING DEVICE

[75] Inventors: Makoto Katsuma; Akira Hiramatsu, both of Kanagawa; Hiroyasu Murakami, Tokyo, all of Japan

[73] Assignee: Canon Kabushiki Kaisha, Tokyo, Japan

[21] Appl. No.: 455,499

[22] Filed: Jan. 4, 1983

[30] Foreign Application Priority Data

Jan. 11, 1982 [JP] Japan .................................. 57-1746
Jan. 11, 1982 [JP] Japan .................................. 57-1748

[51] Int. Cl.³ .................... G03B 17/18; G08B 7/00; G08B 23/00
[52] U.S. Cl. ................. 354/289.1; 354/467; 340/521; 340/384 E
[58] Field of Search .............. 354/53, 60 E, 60 L, 354/289, 467, 289.12, 289.1; 340/517, 521, 384 E, 384 R, 815.01

[56] References Cited

U.S. PATENT DOCUMENTS 4,270,852  6/1981  Suzuki et al. .................. 354/289 X
4,346,978  8/1982  Taniguchi et al. ................ 354/289
4,367,933  1/1983  Sahara .............................. 354/467

Primary Examiner—William B. Perkey
Attorney, Agent, or Firm—Toren, McGeady and Stanger

[57] ABSTRACT

A camera with a voice transmitting device able to detect necessary informations for judging various states of the camera at the time of photography and to make a weighing of the informations according to degrees of importance of thus detected informations so that when there exists a certain information selected by the weighing an indication or an instruction corresponding to the information is transmitted by voices to a photographer.

1 Claim, 14 Drawing Figures

FIG. 2A

ENCODER

| INPUT | OUTPUT | | | | STATE | VOICES | RELATIONSHIP WITH SW7 |
|---|---|---|---|---|---|---|---|
| | $E_0$ | inv6 | inv7 | inv8 | | | |
| ① | 1 | 1 | 0 | 0 | BATTERY VOLTAGE IS LOW | BATTERY IS LOW | NO RELATIONSHIP |
| ② | 1 | 0 | 1 | 1 | WARNING FOR OVER EXPOSURE | OVER EXPOSURE | REPORTING MADE BY ON |
| ③ | 1 | 0 | 1 | 0 | HAND SHAKING WARNING | HAND SHAKING | REPORTING MADE BY ON |
| ④ | 1 | 0 | 0 | 1 | WARNING FOR UNDER EXPOSURE | UNDER EXPOSURE | REPORTING MADE BY ON |
| ⑤ | 1 | 1 | 1 | 1 | LENS CAP IS ON | LENS CAP | NO RELATIONSHIP |
| ⑥ | 1 | 1 | 0 | 1 | FILM TROUBLE | FILM TROUBLE | NO RELATIONSHIP |

DIGITAL MEMORY

| VOICE | ROW ADDRESS | | | | | | |
|---|---|---|---|---|---|---|---|
| | ⑦ | ⑧ | ⑨ | ⑩ | ⑪ | ⑫ | ⑬ |
| ONE | 1 | 0 | 0 | 0 | 0 | 0 | 0 |
| TWO | 0 | 1 | 0 | 0 | 0 | 0 | 0 |
| THREE | 1 | 1 | 0 | 0 | 0 | 0 | 0 |
| FOUR | 0 | 0 | 1 | 0 | 0 | 0 | 0 |
| FIVE | 1 | 0 | 1 | 0 | 0 | 0 | 0 |
| SIX | 0 | 1 | 1 | 0 | 0 | 0 | 0 |
| SEVEN | 1 | 1 | 1 | 0 | 0 | 0 | 0 |
| EIGHT | 0 | 0 | 0 | 1 | 0 | 0 | 0 |
| NINE | 1 | 0 | 0 | 1 | 0 | 0 | 0 |
| TEN | 0 | 1 | 0 | 1 | 0 | 0 | 0 |
| BATTERY IS LOW | 0 | 0 | 0 | 0 | 1 | 0 | 0 |
| OVER EXPOSURE | 0 | 0 | 0 | 0 | 0 | 1 | 1 |
| HAND SHAKING | 0 | 0 | 0 | 0 | 0 | 1 | 0 |
| UNDER EXPOSURE | 0 | 0 | 0 | 0 | 0 | 0 | 1 |
| LENS CAP | 0 | 0 | 0 | 0 | 1 | 1 | 1 |
| FILM TROUBLE | 0 | 0 | 0 | 0 | 1 | 0 | 1 |

FIG.5

BATTERY CHECK (INSUFFICIENT VOLTAGE)

| Signal | State |
|---|---|
| MS | ON |
| BC | ON |
| OUTPUT FROM IC1 | "1" |
| Eo OUTPUT FROM ENC | "1" |
| OUTPUT FROM inv.6 | "1" |
| OUTPUT FROM inv.7 | "0" |
| OUTPUT FROM inv.8 | "0" |
| OUTPUT FROM Dr1 | "1" |
| LED1 | ON |
| OUTPUT FROM OR2 | "1" |
| MEM | ON |
| VOLTAGE CHARGED AT C1 | +N |
| OUTPUT FROM inv.11 | "0" |
| OUTPUT FROM FF4 | "0" |
| RG2 | OFF |

FIG.9

|  | WHEN A SELF-TIMER IS USED | WHEN THERE IS A TROUBLE IN FILM |
|---|---|---|
| OUTPUT FROM OS2 | ⌐"1"⌐ | |
| OUTPUT FROM OS3 | | "0" ⌐"1"⌐ |
| OUTPUT FROM FF3 | ⌐"1" "0"⌐ | |
| TR12 | ⌐ON OFF⌐ | |
| TR13 | ⌐ON OFF⌐ | |
| M | ⌐ON OFF ⌐ON | |
| SW3 | ⌐ON OFF | |
| OUTPUT FROM AND5 | | "0" ⌐"1"⌐ |
| Eo OUTPUT FROM ENC | | ⌐"1" |
| OUTPUT FROM inv.6 | | ⌐"1" |
| OUTPUT FROM inv.7 | | "0" |
| OUTPUT FROM inv.8 | | ⌐"1" |

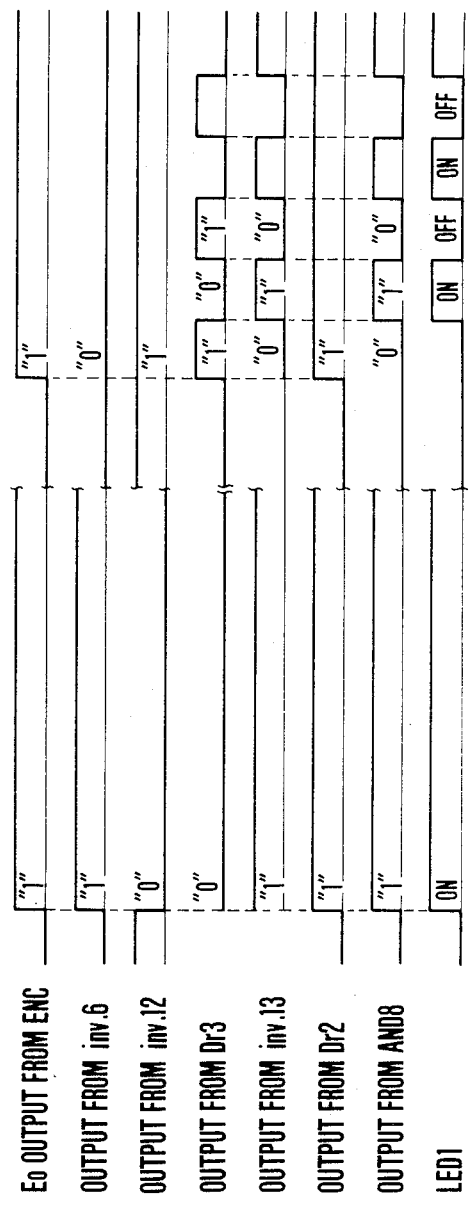

CAMERA WITH A VOICE TRANSMITTING DEVICE

BACKGROUND OF THE INVENTION

1. Field of the Invention

The present invention relates to a camera with a voice transmitting device equipped therein to inform various kinds of information by voices.

2. Description of the Prior Art

Heretofore, various kinds of warning indications or instructions in a camera have been done by visually display of such indications or instructions within a view finder by a meter pointer or a light emitting element, etc. Such visual display method is useful for indicating various kinds of warnings concerning a camera, but under a state a photographer is catching an object within a view finder and is about to decide a composition of a picture, etc., the very viewing attention of the photographer is focused solely on the object within the view finder, thus he is apt to overlook the warning display, etc. within the view finder, resulting in a failure in the photo-taking in many cases. As a measure to prevent such failure, various methods have been proposed, such as flickering a lighted display, but a warning by an eyesight only may not be sufficient and it has been proposed to employ a warning by a hearing in addition to the warning by eyesight. That is a system to make various warning indications by a generation of simple intermittent sounds or continuous sounds by a very thin type of a sound producing body (a speaker) built in a camera.

In such a system, sounds from the speaker built in the camera are intermittent sounds or continuous sounds with a mono frequency, and even when a photographer is absorbed in an object and does not notice a warning by a visual display the warning sounds are produced from the speaker built in the camera at a vicinity of ears of the photographer who is at a photo-taking posture, therefore the photographer will not miss to hear the sounds except in rare occasions, thus a failure in the photo-taking can be prevented. Here, the warning sounds in said system are simple intermittent or continuous sounds and it is difficult to distinguishingly indicate many warning indications or instructions, thus even if many kinds of frequencies generated or intermittent states are selected it will be difficult to discriminatingly identify various warning indications, etc. by instantly identifying the difference in frequencies or intermittent state.

In order to solve such problem the applicant has proposed the patent, U.S. Pat. No. 4,270,852. This proposal is similar to the above-mentioned system in making various warning indications or instructions by hearing, but in this proposal voices of spoken language are used so that said indications or instructions can be instantly recognized, thus a camera having a device to produce concrete voices built therein has been proposed.

However, said proposal still has the following shortcomings:

(1) Voice reports are made every time a warning or an instruction is to be given, which is annoying.

(2) Even for the matters a photographer knows through his own experience (he may want to go ahead to take a picture in spite of somewhat under exposure, or to take a picture even if there is a risk of some hand shaking, etc.), warnings by sounds will be given persistently.

For covering said shortcomings to some extent said U.S. Pat. No. 4,270,852 provides inhibiting means to inhibit a voice reporting from functioning, but it is nothing but to change over of an active mode and a non-active mode of voice reporting.

SUMMARY OF THE INVENTION

It is an object of the present invention to provide a camera which makes a weighing of various kinds of information for a camera so that voice transmittance will be made when information selected by weighing is in existence.

Another object of the present invention is to provide a camera to indicate a weighing state of various kinds of information.

Further, other objects of the present invention will be made clear by concrete examples to be described below.

BRIEF DESCRIPTION OF THE DRAWINGS

FIG. 2A is a drawing to show input signals corresponding to each state of an encoder shown in FIG. 1.

FIGS. 5, 6, 7, 8, 9, 10, 11 are timing charts to explain FIG. 1, respectively.

FIG. 13 is a timing chart to explain FIG. 12.

DESCRIPTION OF THE PREFERRED EMBODIMENTS

Now, examples of the present invention shall be explained in detail.

Figure 1:
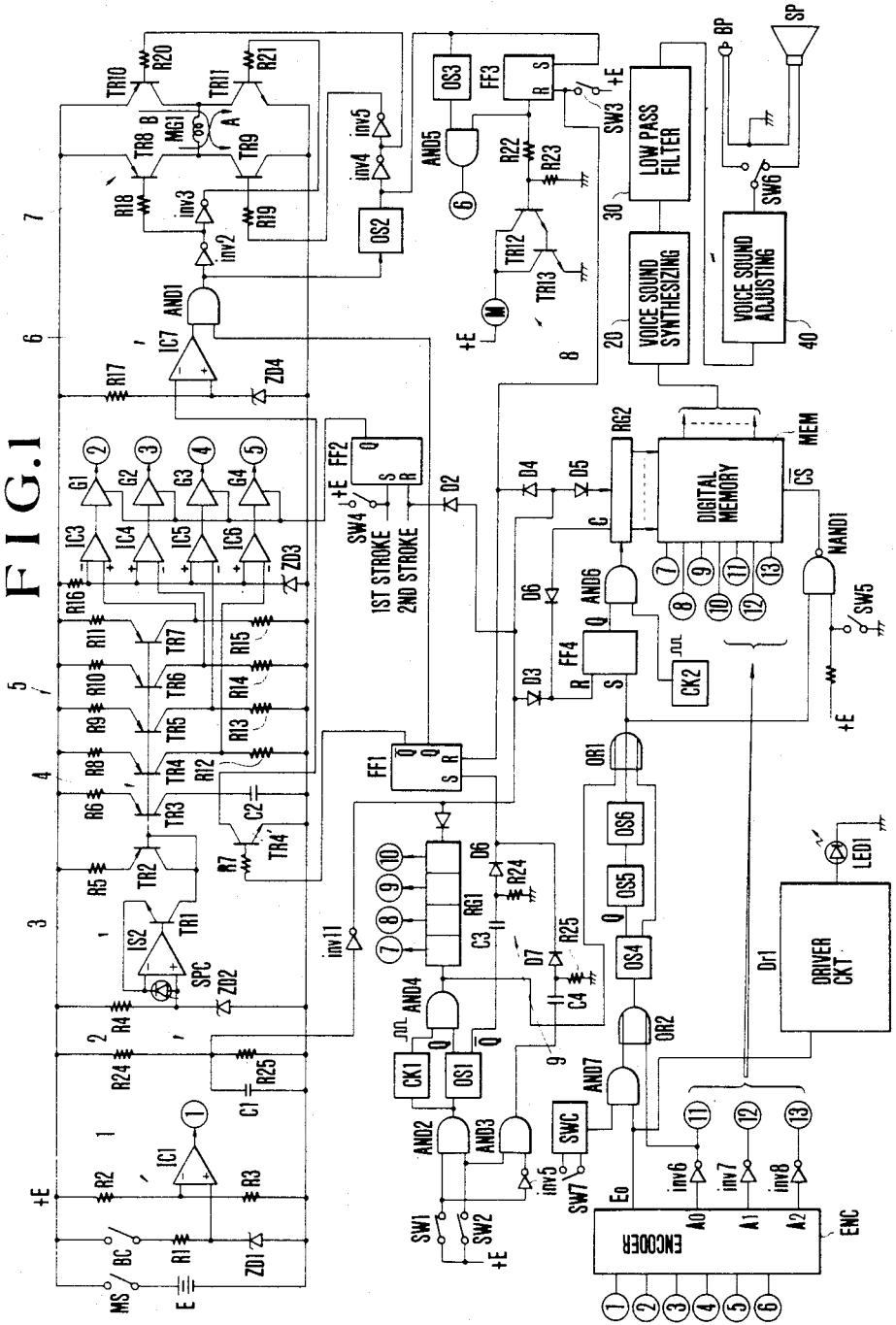
FIG. 1 is a control circuit diagram for a camera having a conversation type voicing device built therein according to an example of the present invention.

FIG. 1 is a circuit diagram to show an example of a camera having a voicing device built thereinto according to the present invention. As a memory medium in a voicing device in the present invention a semiconductor memory is used, and digitalized warnings or instructions signals are memorized in the same, thus a driving of a recording medium, etc. is not needed in a reproduction thereof, not as in a magnetic recording system. Therefore, the invention has many advantages that there will be no generation of noises by rotations, etc. at a time of reproduction, also there will be no changes in performance due to humidity, temperature, dust and aging, etc., like in a device using a magnetic head, thus there will be no need for repairs or maintenance therefor, and a device can be composed in a very small size.

In the drawing, E is a power source such as a battery, MS is a main switch, BC is a battery check switch, ZD1 is a Zener diode to impress a reference voltage onto (+) terminal of an IC1 to be described later, R1 is a resistor for limiting current of the ZD1, and what are shown as R2, R3 are resistors for dividing to supply voltages to be measured to (−) terminal of an IC1 to be described below. What is shown as IC1 is a comparator, and said BC, R1 to R3, ZD1, IC1 constitute a battery check circuit (1).

What are shown as R24, R25, C1 and inv 11 are elements constituting an auto clear circuit (2) and are to place all resistors and flip-flops in a reset state. What are shown as R4, ZD2, SPC, IC2, TR1, TR2 and R5 are element group to constitute a photo-sensing circuit (3), wherein ZD2 is a Zener diode to supply reference voltage to (+) terminal of an IC2 to be described later, and R4 is a resistor to limit current of the ZD2, while SPC is a light receiving device to convert an intensity of illumination from an object to a voltage. IC2 is an operational amplifier to amplify signals produced at the light receiving device, and R5, TR2 and TR1 are element group to constitute a circuit to flow such current as corresponding to an output voltage from the operational amplifier IC2, that is a circuit to flow such current as corresponding to an intensity of illumination.

What are shown as R6, R7, TR3, TR4, C2 are to constitute a time limit circuit (4) to determine a shutter time. R8 to R15, TR4 to TR7 constitute a brightness detection circuit (5) respectively, and TR7 is a transistor for detecting a high brightness, while TR6 is a transistor for detecting a hand shaking. TR5 is a transistor for detecting a low brightness, and TR4 is a transistor for detecting such low brightness as in a case a lens cap is placed over a lens, while ZD3 is a Zener diode to supply reference voltages of IC3 to IC6 to be described below. R16 is a resistor for limiting current of the ZD3, and IC3 to IC6 are comparator group to produce output signals depending on a state of brightness by comparing the reference signals and the signals from the TR4 to TR7. G1 to G4 are 4-state-gate group, and R17, ZD4 and IC7 are element group for a comparator circuit (6) to compare condenser terminal voltage of said time limit circuit (4) and the reference voltages. AND1 is an AND gate, and inv 2 to inv 5 are inverter group, and TR8 to TR11, R18 to R21 are to constitute a driving circuit (7) of an MG1 to be described below, while MG1 is a solenoid to drive a shutter not being shown in the drawing.

OS2, OS3 are respectively one shot multi-vibrator circuits, and FF3 is a flip-flop, while AND 5 is an AND gate. R22, R23, TR12, TR13 are to constitute a driving circuit (8) for a motor M to be described below, and M is a motor to feed a film.

SW1 is a switch for a self-timer and SW2 is a switch for a second stroke which is to be put in at a second stage of a shutter pressing, while AND2 is an AND gate to produce an output when the switch SW2 of the second stroke is placed in ON state under a state the switch SW1 of the self-timer is being put in. CK1 is a clock circuit to oscillate with a cycle of one second, and OS1 is a one shot multi-vibrator to determine a time of a self-timer, while AND 4 is an AND gate to produce signals from the OS1 when the OS1 is at a high level ("1" level). RG1 is a register to count pulses from the AND 4, and FF1 is a flip-flop to determine a timing to drive the time limit circuit (4), while C3, C4, R24, R25, D6, D7 are to constitute a trigger circuit (9). AND 3 is an AND gate, and inv 5 is an inverter to produce signals when the second stroke switch (SW2) is put in at a time the camera is not in a self-timer mode.

Figures 2B, 3:
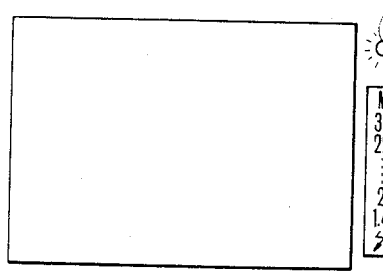
FIG. 2B is a drawing to show input signals corresponding to each state of a digital memory shown in FIG. 1.
FIG. 3 is a drawing to show a field of view in a view finder of the camera shown in FIG. 1.
Figure 4:
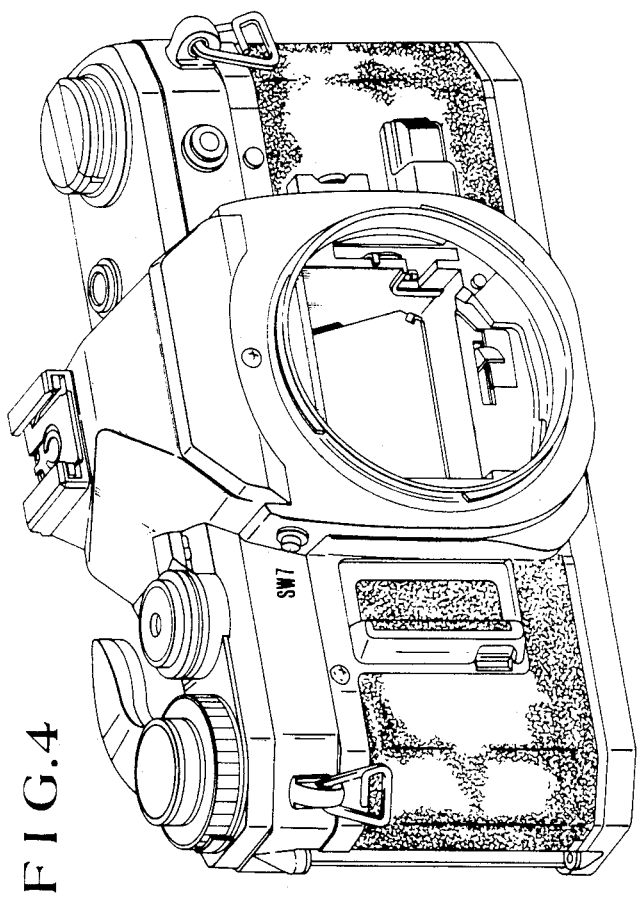
FIG. 4 is an external view of the camera shown in FIG. 1.

FF2 is a flip-flop which is reset as the switch (MS) becomes ON and is set as said switch is opened, and an encoder (ENC) produces binary codes corresponding to the output terminals of A0 to A2 as shown in FIG. 2A when any signal is introduced into terminals 1 to 6, while a terminal E0 is a terminal which becomes to be "1" when any one of the inputs of terminals 1 to 6 becomes to have a high level. SWC is a switching circuit for an external voice actuation, and as shown in FIG. 5 produces "1" as the switch SW1 placed on the camera becomes ON, then a logical multiplication, thereof with E0 is obtained by AND gate AND 7, and after that introduced into an OR2 together with the output coming through the inv 6 of A0 of the encoder (ENC). OR2 is an OR gate. OS4 to OS6 are one shot multi-vibrator to determine a timing to produce voice sounds. OR1 is an OR gate, and FF4 is a flip-flop which is reset by signals from the auto clear circuit (2) or from a carry terminal C of a register RG2, and is set by output signals from the OR1. CK2 is a clock oscillator to promote a counting by the register RG2 to be described below, and NAND 1 is a NAND gate to send signals to a $\overline{CS}$ terminal which selects a digital memory (MEM). AND 6 is an AND gate which receives signals from the CK2 only when an output of the FF4 is "1", and SW5 is a switch to stop voice sounds.

RG2 is a register which counts a number of signals from the AND 6 and designates an address of a digital memory (MEM) to be described later. The digital memory (MEM) has data, obtained by converting words produced at the camera into bits of "1" "0", stored therein, and when an address is designated by a group of terminals ⑦ to ⑬ digital signals are produced in turn in synchronism with the clock pulses from the CK2, then said signals are converted to voice sound analog signals by a voice sound synthesizing circuit (20), and are sent through a low pass filter 30 where high frequency signals are shut off, thus finally are produced as voice sounds through a volume adjusting circuit 40 by a speaker (SP) or an earphone (BP) SW6 is a switch to make a change over between the earphone (BP) and the speaker (SP). Said voice sound synthesizing circuit (20) may be made by a known type of circuit, such as a PARCOR system, an LPC system, or a CSM system, etc.

Dr1 is a driving circuit for a light emitting diode LED 1 for a visual display, and the LED1 is provided within a field of vision of a view finder.

Next, explanations shall be made on operations of the circuits shown in FIG. 1.

First, every time the main switch MS is placed in ON state, a voltage (+E) of the voltage source E is supplied to each circuit. Before a photographing a state of the voltage (+E) of the battery is checked by the switch BC. That is, as shown in FIG. 5, when the switch BC is placed in ON state, current flows through the resistor R1 to the Zener diode ZD1, and the reference voltage is supplied to the (+) input terminal of the converter IC. On the other hand the voltage (+E) of the battery being divided by the resistors R2 and R3 is supplied to (−) input terminal side. If the voltage (+E) of the battery is below the reference voltage, the output of the IC1 becomes to have a logical high level ("1"), and if on the other hand the voltage (+E) of the battery is higher than the reference voltage, the output of the IC1 will have a logical low level ("0"). Signals thereof are connected to the terminal ① of the encoder (ENC). When the terminal ① is "1", that is when the battery voltage (+E) is below the reference voltage, the outputs of the output terminal E0 and the inv 6 of the encoder (ENC) become to have "L" level and terminals of inv 7 and inv 8 become "0". Also, the E0 terminal will become "1" when any one of input terminals ① to ⑥ of the encoder (ENC) becomes "1", and the E0 becomes "0" only when all of the terminals ①  to ⑥ become "0".

The outputs A0, A1 and A2 of the encoder (ENC) are so made that when such signals as converting the input terminals ① to ⑥ to binary codes are produced out of the same and when two signals enter simultaneously into the encoder (ENC), one with lower level will be given a preference.

When the E0 becomes "1", the driver circuit Dr1 for lighting or flickering the LED 1 for a visual warning display is actuated and the LED 1 is lighted or flickered to make a warning display. At the same time the "1" level output of the inv 6 reaches the OS4 through the OR2. Therefore, the output of the OR2 becomes to have "1" level regardless of the SW7, SWC, AND 7, therefore "1" level signal is introduced into the OS4 and an operation shown in FIG. 6 will be made. That is, when "1" level signal is introduced into the OS4, the three one shot multi-vibrators, OS4 to OS6 are connected in series and a pulse of one second is produced once by these circuits. Signals from the output Q of the OS4 are introduced through the OR gate OR 1 into an input terminal S of the flip-flop FF4 to set the FF4. The clock oscillator CK2 is oscillating with such a cycle as taking an access time of the digital memory (MEM) into consideration. During a period of time when the Q terminal of the FF4 is "1", the AND gate AND 6 is opened and the clock pulses from the clock oscillator CK2 an introduced into the input of the register RG2, then the register RG2 starts a counting from 0. This will determine an address of rows on a matrix of the digital memory (MEM).

Also, the terminal 11 out of the terminals ⑦ to ⑬ of the digital memory (MEM) becomes to have "1" level as signals from the A0 of the encoder (ENC) have been given thereto through the inverter inv 6, thus a row address on the matrix of the digital memory (MEM) will be determined. When the voltage (+E) of the battery is lower than the reference voltage and an attention of a photographer is to be called by voices "battery is low", as long as such voice sounds necessary for producing voices of "battery is low" have been sampled as a parameter of time and such digital voice sound parameter is stored beforehand as signals of "1" "0" in the digital memory (MEM), a row address of the digital memory (MEM) only may be designated. When an output of the OR1 is at "1" level, if the voice sound stop switch SW5 is in OFF (voice sound producing) state if input terminals of the NAND gate NAND 1 will both have "1" level, therefore the terminal $\overline{CS}$ will have an output of "0" level, and an address of the matrix of the digital memory (MEM) to be selected is set, and as the chip select terminal $\overline{CS}$ is selected digital voice sound parameter signals (SOUND) for voices of "battery is low" are produced out of output terminals of the digital memory (MEM) and are converted to analog voice sound signals by the voice sound synthesizing circuit (20), then have high frequency elements thereof removed by the low pass filter 30, thus proper analog voice sound signals are sent through the volume adjusting circuit 40 and voices of "battery is low" are produced from the speaker SP or the earphone BP.

Also the register RG2 has the C terminal which becomes to have "1" level when a counting is up, and is introduced into a R terminal of the flip-flop FF4 through the diode D6 to reset the FF4. As a result a Q terminal of the FF4 becomes to have "0" level to close the gate AND 6 also to stop the counting by the register RG2. When the above-mentioned output of the OR gate OR 1 becomes "0", the output of the NAND 1 becomes "1" and outputs from the digital memory (MEM) will be inhibited.

Also, the R24, R25, the C1, the inv 11 and D1 to D6 constitute the auto clear circuit (2), and as the main switch MS is turned to ON, the capacitor C1 is charged through the resistor R24 as shown in FIG. 5, wherein a final voltage thereof will be determined by a dividing ratio of R24, R25. When the charging voltage of the capacitor C1 becomes higher than a threshold voltage (thr) of the inverter inv 11, an output terminal of the inv 11 is changed from "1" level to "0" level. At the time when the output terminal of the inv 11 is at "1" level, RG1, RG2 and FF1 to FF4 are reset beforehand.

Next, when a shutter button (not being shown in the drawing) is pressed from a first stroke to a second stroke while the switch SW1 of a self-timer is ON, and the SW2 becomes ON, both inputs of the AND gate AND 2 become to have "1" level, therefore the output of the AND 2 becomes "1" level. On the other hand as the inverter inv 5 has been introduced into the gate AND 3, the inputs of the AND 3 become "1", "0" and the output of the same becomes "0" level. As the output of the AND 2 becomes "1" level, the time of the one shot OS1 functions and at the same time therewith the clock oscillator CK1 starts oscillations with a cycle of one second.

The AND 4 will have its output becoming "1" when. these two inputs are simultaneously "1" level and the register RG1 starts a counting. A counting state thereof is produced at the output terminals ⑦ to ⑩ and a row address in the matrix of the digital memory (MEM) is designated.

On the other hand, the output of the AND 4 enters into the gate OR1 to set the flip-flop FF4, then the output thereof opens the gate AND 6, to introduce the pulses of the clock CK2 into the register RG2. The register RG2 counts said clock pulses and the output of said counting state designates a column address in the matrix of the digital memory (MEM) that is a column address of the inputs ⑦, ⑧, ⑨, ⑩.

Also when the output of the OR gate OR1 is introduced into the chip select terminal $\overline{CS}$ of the register RG2 through the gate NAND 1, such digital voice sound parameter signals (SOUND 1, SOUND 2) as "one" when the self-timer is at a first second, for example, and "two" when it is at a 2nd second, then three, four, five, six, seven, eight, nine, ten will be produced from the digital memory (MEM). After that, as in a same manner as mentioned above, said signals are converted to analog voice sound signals by the voice sound synthesizing circuit (20) and are produced as voices by the low-pass filter 30, the volume adjusting device 40, and SP or EP.

Figure 8:
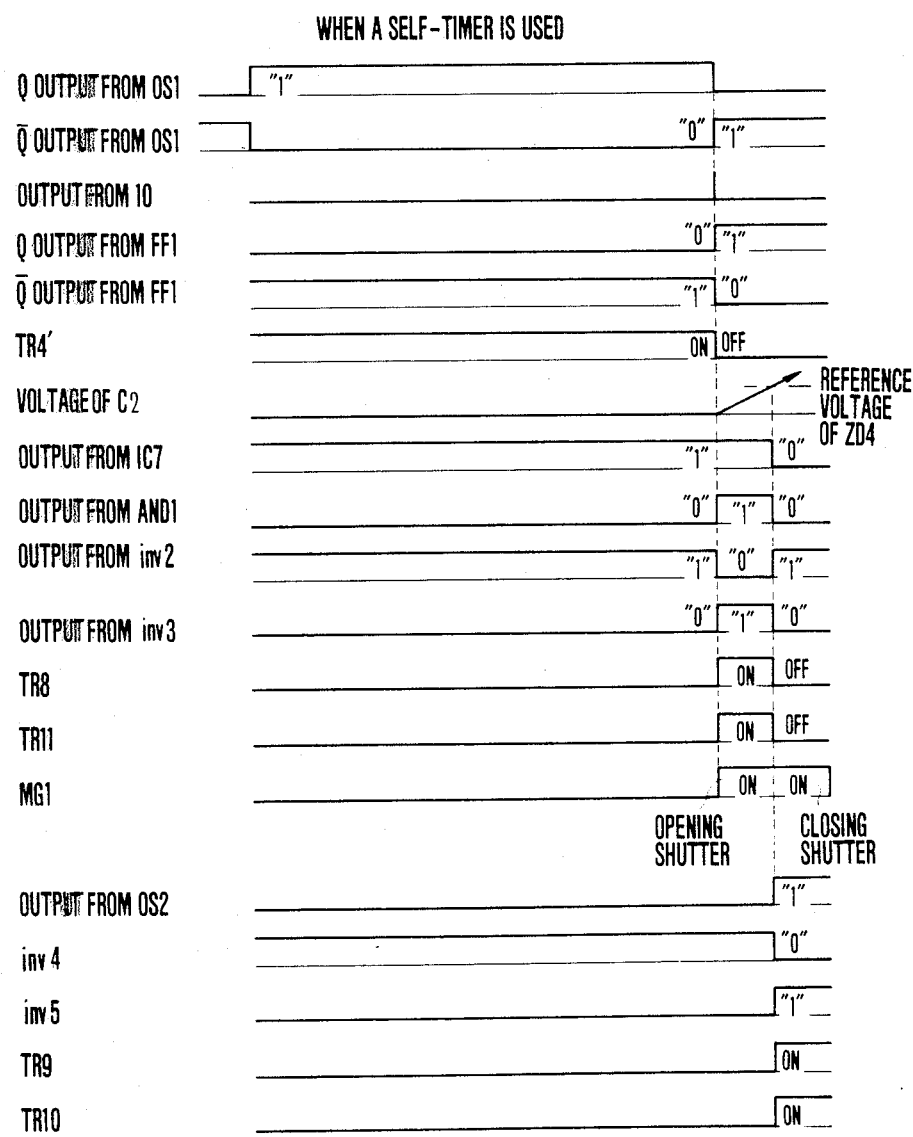

On the other hand, the rise signal, for the output $\overline{Q}$ of the OS1 to change from "0" to "1" level, sets the flip-flop FF1 through the C3, R24, D6 of the trigger circuit (9) which is a differentiation circuit as shown in FIG. 8. Also, the output $\overline{Q}$ of the FF1 is connected to a base input of the TR4, while the other output Q is connected to the input of the AND 1.

On the other hand, the R4, ZD2, SPC, IC2, TR1, R5 and TR1 constitute a photo-sensing circuit (3) to receive an intensity of illumination from an object by the light receiving element SPC, generating such voltage as corresponding to the intensity of illumination, then said voltage is amplified by the operating amplifier IC2, then current flows through the R5, TR2 and TR1 corresponding to said voltage, and by this, current also flows to the TR3, TR4, TR5, TR6 and TR7 in a same manner, when the $\bar{Q}$ terminal of the flip-flop FF1 is charged from "1" level to "0" level, the transistor TR4 is changed from ON to OFF and said current flows to the capacitor C2. At the same time the "1" level produced at the Q terminal of the flip-flop 1 passes through the gate AND 1 and has the inv 2 to produce "0" output, then changes the output of the inv 3 to "1". By said level the transistors TR8 and TR11 will be conducted through and current flows through a path A to the magnet MG1, and shutter screens (not being shown in the drawing) will be opened by said electrification of the magnet.

On the other hand, as the charging of the capacitor C2 makes progress and the voltage thereof becomes higher than the reference voltage ZD4, the output of the comparator IC7 changes from "1" level to "0" level to close the gate AND 1. When the output of the AND 1 becomes "0" level, the inv 2 becomes "1" and the inv 3 becomes "0", while the transistors TR8, TR11 are both shut off.

On the other hand, the output of the AND 1 actuates the one shot OS2 (triggers the same at "0" level), and the inv 4 will have "0" output while the output of the inv 5 becomes "1" level, and the transistors TR9 and TR10 are conducted through. By this current flows through a current path B to the magnet MG1 to close the shutter screens.

On the other hand, as shown in FIG. 9, a timer of the one shot OS3 is actuated by the output of the OS2 and the flip-flop FF3 is also set thereby. During a period of time when the output of the FF3 is at "1" level, the transistors TR12, TR13 have current supplied thereto to drive the motor M thereby. Said motor M is a film feeding motor, and a film is fed by driving this motor. When the feeding of the film is completed a switch SW3 for a motor driving completion becomes ON to reset the flip-flop FF3. The output of the FF3 becomes "0" level by the resetting signal thereof to shut off the TR12, TR13 and to stop a rotation of the film feeding motor (M).

When said film feeding motor M is operating for a longer time than a time of the timer of the one shot OS3, that is when the film is clogged in a film feeding mechanism or the film is not wound up, the motor driving completion switch SW3 continues an OFF state, and a driving time of the motor M becomes longer. The one shot OS3 is a timer which changes from "0" to "1" after an elapse of a predetermined period of time, and is changed from "0" to "1" when the motor driving takes abnormally longer time as mentioned above. At this time the AND 5 is changed from "0" to "1" level and the output thereof enters into the input terminal ⑥ of the encoder (ENC), and the outputs of the inv 6 to inv 8 become "1", "0", "1" level, respectively, by the outputs A0 to A2 of the encoder (ENC), while the E0 also becomes "1" level. The A0, A1, A2 respectively designate row addresses in the matrix of the digital memory (MEM).

Figure 6:
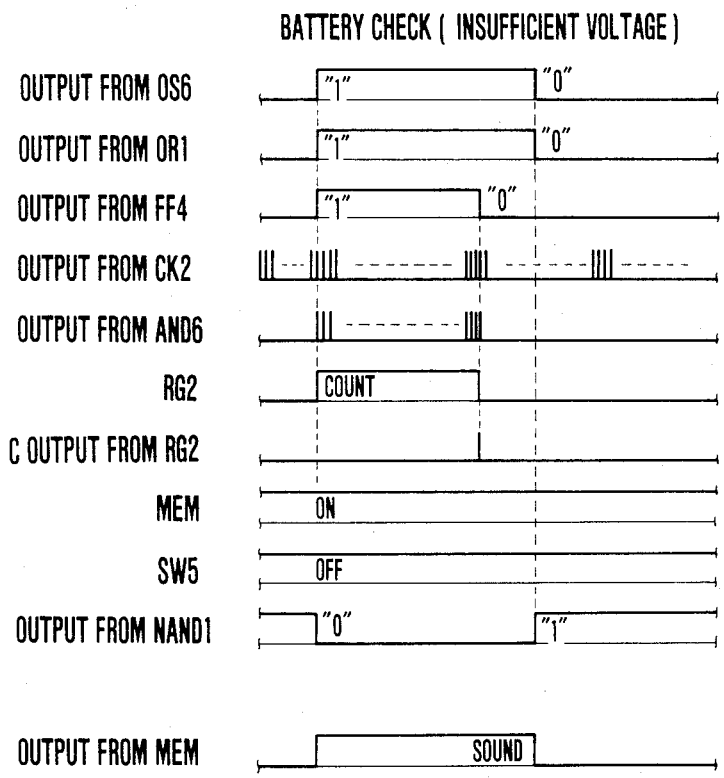
Figure 7:
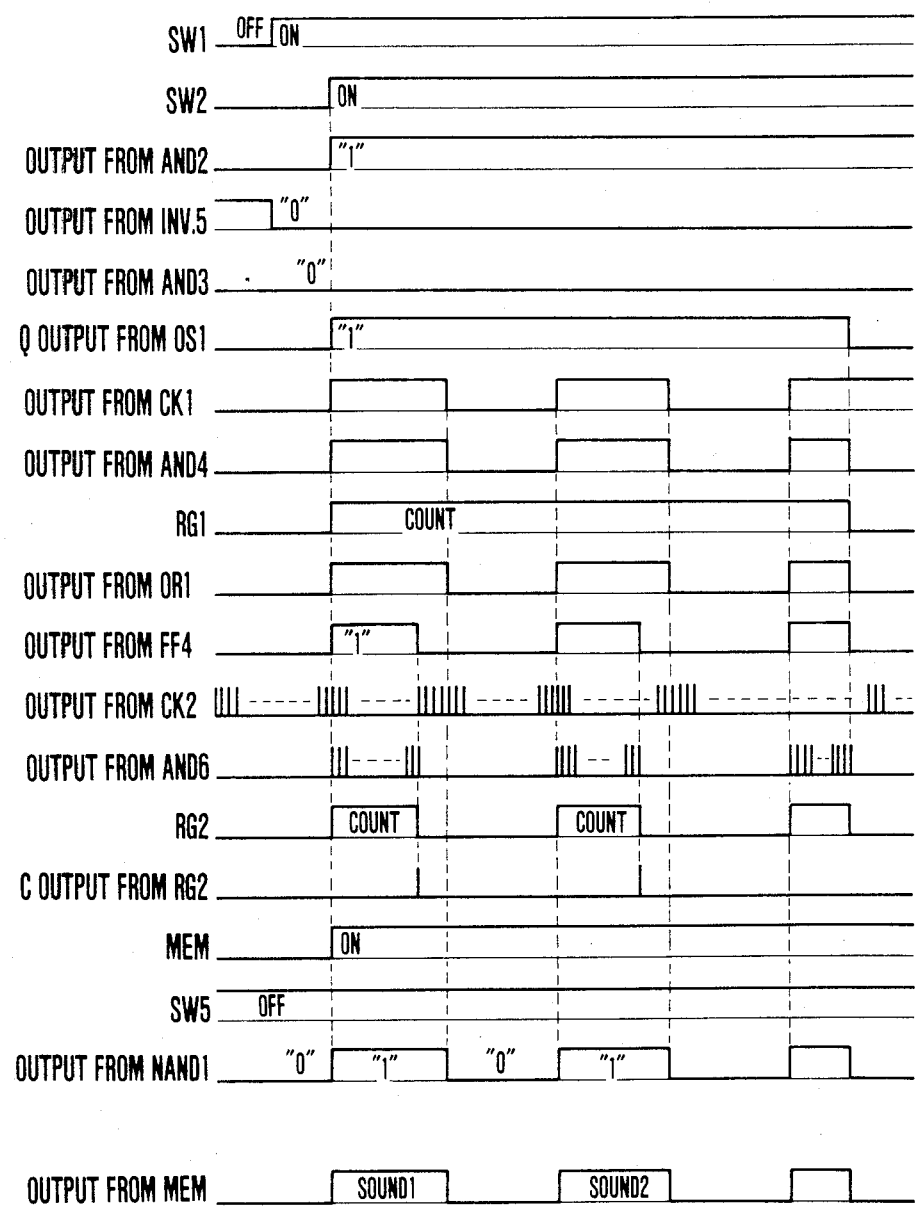

On the other hand, since the output of the inv 6 is "1" level, "1" is introduced into the OR2 and the output of the OR2 becomes "1" level regardless of the SW7, SWC, AND 7, therefore "1" level signal is introduced into the OS4, then a row address of the digital memory (MEM) is designated in a same manner as in the case of the battery check shown in FIG. 6, and voices of "film trouble" are produced from the speaker SP or the earphone BP by the digital voice sound parameter signals (SOUND).

At a time of a photo-sensing, such current as corresponding to an intensity of illumination from an object flows through the R5, TR2, TR1, SPC and ZD2 and same current also flows to the transistors TR3 to TR7. The current of the TR4 to TR7 flows to the R12, R13, R14, R15, and values in voltage droppage in each of them will be used to judge a state of the intensity of illumination from the object. Said judging is done by the comparators IC3, IC4, IC5 and IC6 which compare the voltage droppage as the current flows to each of said resistors and the reference voltage obtained from the Zener diode ZD3, and a timing to produce signals thereof from the G1 to G4 will be determined by the flip-flop FF2. In a camera having a lens shutter, there are cases when a photographer is to take a picture with a cap placed over a lens. In a case of an extremely low brightness such as this, the current flowing to the R12, R13, R14, R15 is very small, thus the voltage drop caused thereby will be also small. Therefore it will be naturally lower than the reference voltage, and the output of the IC6 becomes "1", and that of the IC3 becomes "0", the IC4 "1" and IC5 "1", respectively.

Figure 10:
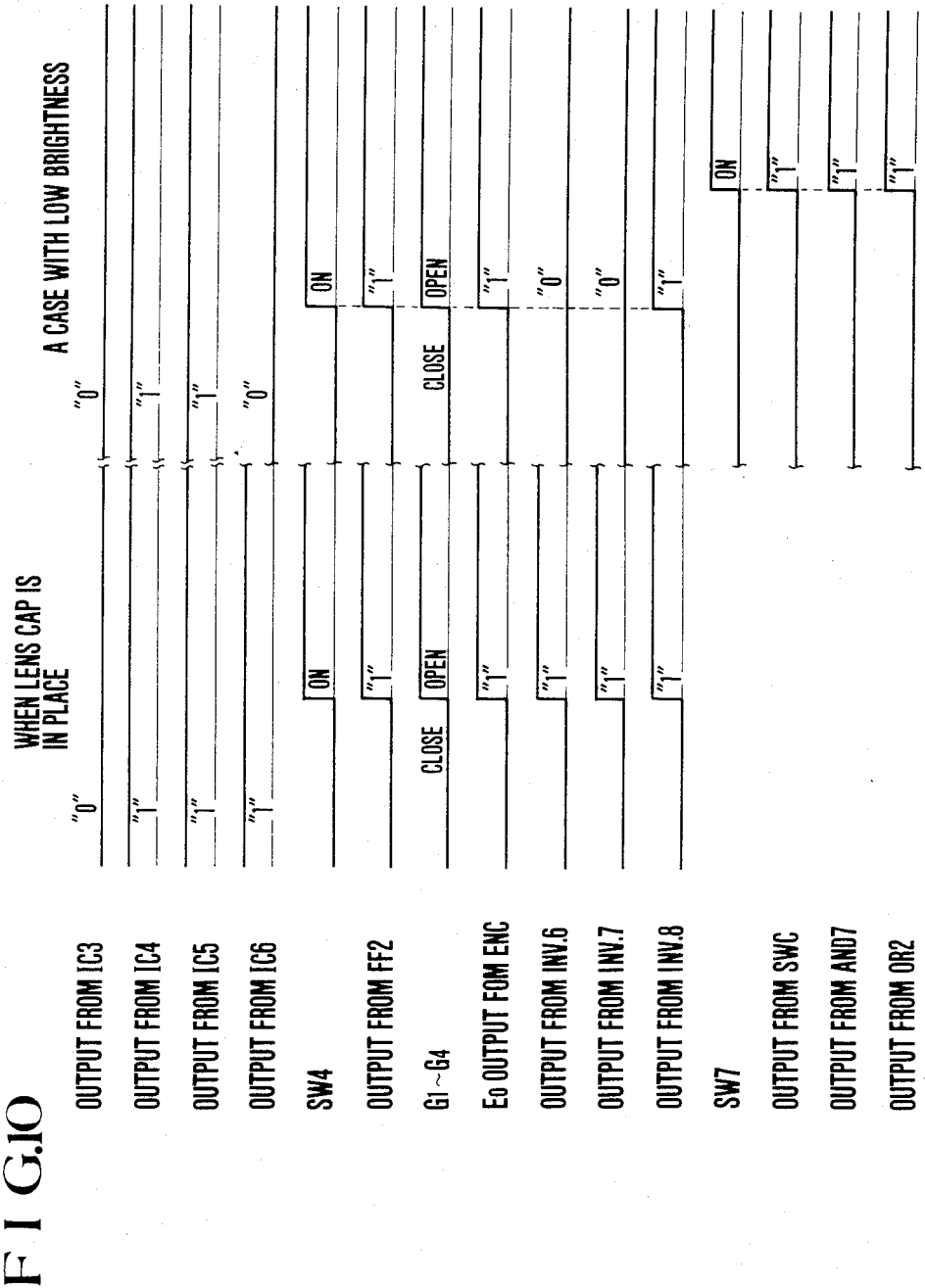

And when the shutter button (not being shown in the drawing) is pressed and a first stroke is reached under this state a switch SW4 of the first stroke is put in as shown in FIG. 10, and signals enter into an S terminal of the flip-flop FF2 to place the FF2 in a set state. By this an output Q of the FF2 becomes "1" level to open the gates G1 to G4, while the input terminals ① to ⑥ of the encoder (ENC) become "0", "0", "1", "1", "1", "0" respectively and the outputs of the inv 6 to the inv 8 become "1", "1", "1", as shown in FIG. 2. Since output of the inv 6 becomes "1", the row addresses of the digital memory (MEM) are designated as "1", "1", "1" by the ⑪, ⑫, ⑬, regardless of the ON, OFF of the SW7 as shown in FIG. 6, and in a same manner as in the case of the battery check and film trouble mentioned above, voices, "lens cap" are produced from the speaker SP or the earphone BP by such digital voice sound parameter signals (SOUND) as "lens cap" through the voice sound synthesizing circuit (20).

When an object has a low brightness, the current flowing through the R12, R13, R14, and R15 will not be samller than that flowing when the lens cap is in place, but samll current flows to each resistor thus a magnitude of a voltage droppage thereby is also small. Therefore the voltage at input terminals of the IC3, IC4, and IC5 will become lower than the reference voltage, while the voltage at an input terminal of the IC6 will be higher than the reference voltage. Thus the IC3 will have "0" output, and IC4 will have "1" output, while the IC5 will have "1", and the IC6, "0". When a shutter button (not shown in the drawing) is pressed under this state and the first stroke is reached, the first stroke switch SW4 is put in and signals enter into the S terminal of the flip-flop FF2 to place the FF2 in a set state. By this, the output Q of the FF2 will have "1" level to open the gates G1 to G4, and the input terminals ① to ⑥ of the encoder ENC will have "0", "0", "1", "1", "0", "0", respectively, as shown in FIG. 2A, then outputs of the inv 6 to inv 8 will become "0", "0", "1", respectively, also as shown in FIG. 2A. Here, the output of the inv 6 is "0". Also, since the E0 will become "1", the Dr1 is actuated, and the LED 1 is lighted or flickered as shown in FIG. 5 to give a warning.

In this case, depending on a photographer, what is being warned may be recognized through said visual warning display by the LED 1, and he or she can counter the circumstance such as going ahead to take picture anyhow if he or she wants to take a picture in spite of somewhat under exposure. Also depending on a photographer, he or she may not understand what is being warned by the LED 1, then he or she closes the SW7 which is the external voice sound reporting means to find out what is being warned. Then, an output of the switching circuit SWC becomes "1" as shown in FIG. 10, and said "1" is introduced into the OR2 by the AND 7. Thus, the "1" is introduced into the OS4 by an action of closing the SW7. Thereafter, in the same manner as in the case of FIG. 6, a voice reporting, "under exposure" will be made by the speaker SP or the earphone through the voice sound synthesizing circuit (20), etc., with digital voice sound parameter signals (SOUND) at row address of the digital memory (MEM) being designated as "0", "0", "1" by the inv 6 to inv 8.

Figure 11:
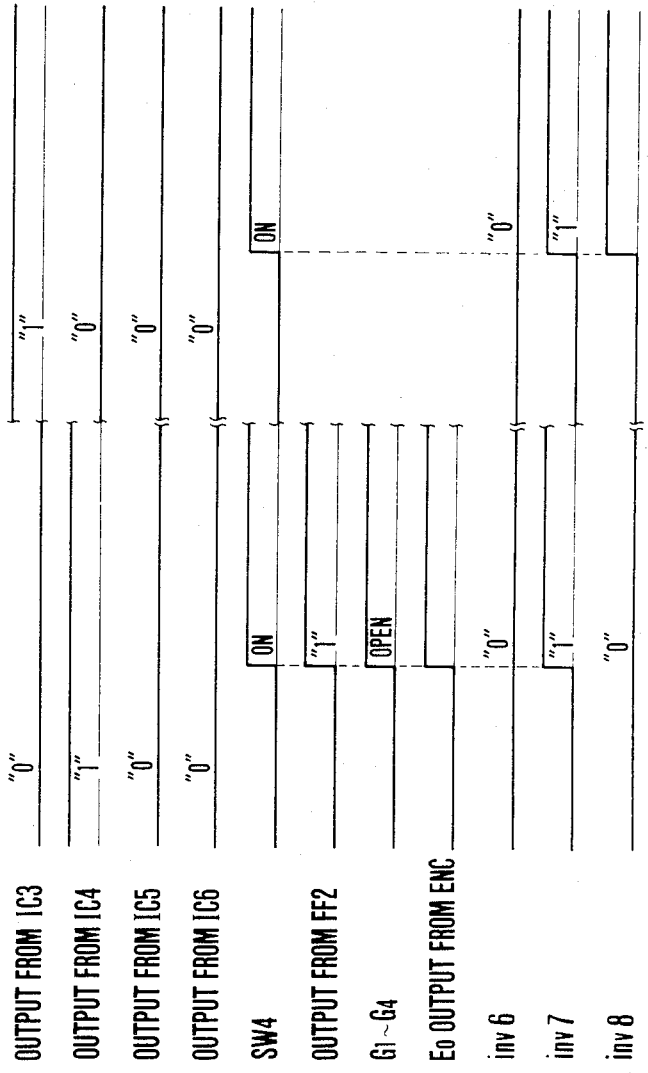

And in a case of an object with such low brightness as possibly causing a hand shaking, current flowing through each of the resistors R12 to R15 will be somewhat small, although not as small as that in the case of the under exposure warning, thus a voltage droppage will be also small. Therefore, the input terminals of the IC3, IC4 will be lower than the reference voltage, while the input terminals of the IC5, IC6 will be higher than the reference voltage. Thus, as shown in FIG. 11, the IC3 will have "0", the IC4 "1", and the IC5 "0", while the IC6 will have "0", and in the same manner as mentioned above, the input terminals ① to ⑥ of the encoder (ENC) will have "0", "0", "1", "0", "0", "0" introduced thereinto, respectively by the first stroke of the shutter button. The outputs of the inv 6 to inv 8 will become "0", "1", "0" as shown in FIG. 2A. At this time also the inv 6 has "0". Also, as the E0 becomes to be "1", the Dr1 is actuated and the LED 1 is lighted or flickered as shown in FIG. 5 to visually display that the camera is in a warning state. Therefore, depending on a photographer, he or she may recognize what is being warned as in the case of the under exposure warning and can take whatever action he or she may want to take therefor. Also, a photographer who can not understand what is having warned closes the SW7 which is the external voice reporting means. Then, the output of the switching circuit SWC becomes "1" in the same manner as in the case of FIG. 10, and "1" will be introduced into the OS4 through the AND 7 and the OR2. Therefore, the OS4 will have the "1" introduced thereinto by an action of closing the SW7, then the SP or the BP make a voice report of "hand shaking" by the digital voice sound parameter signals (SOUND) with the row address of the digital memory (MEM) being designated as "0", "1", "0" by the inv 6 to the inv 8 in the same manner as in the case of FIG. 6, through the voice sound synthesizing circuit (20), the low pass filter 30, and the volume adjusting device 40.

In a case an over exposure warning is needed, current flowing through each of the resistors R12 to R15 will be great, and a voltage droppage thereby will also be great. Therefore, the input terminal of each of the IC3 to IC6 will have a higher voltage than the reference voltage. Thus, as shown in FIG. 11, the IC3 becomes "1", and the IC4 to IC6 become "0". Similarly "0", "1", "0", "0", "0", "0" will be introduced into the input terminals ① to ⑥ of the encoder (ENC), respectively, and the inv 6 to inv 8 will have outputs of "0", "1", "1". Since the output of the inv 6 is "0", in the same manner as in the case of the under exposure warning and the hand shaking, a voice report of "over exposure" will be made by closing the SW7 with the digital voice sound parameter signals (SOUND) at the row address of the digital memory (MEM) being designated as in the case of FIG. 10.

As has been explained above, in a case a photo-taking is impossible (for example, a lens cap is in place, trouble in film feeding, or insufficient battery power), a voice report is made regardless of the switch SW7 as the external voice reporting means, and at a time when a care should be exercised even though a photo-taking itself is not impossible, only when the switch SW7 as the external voice reporting means is operated a voice reporting will be made.

Figure 12:
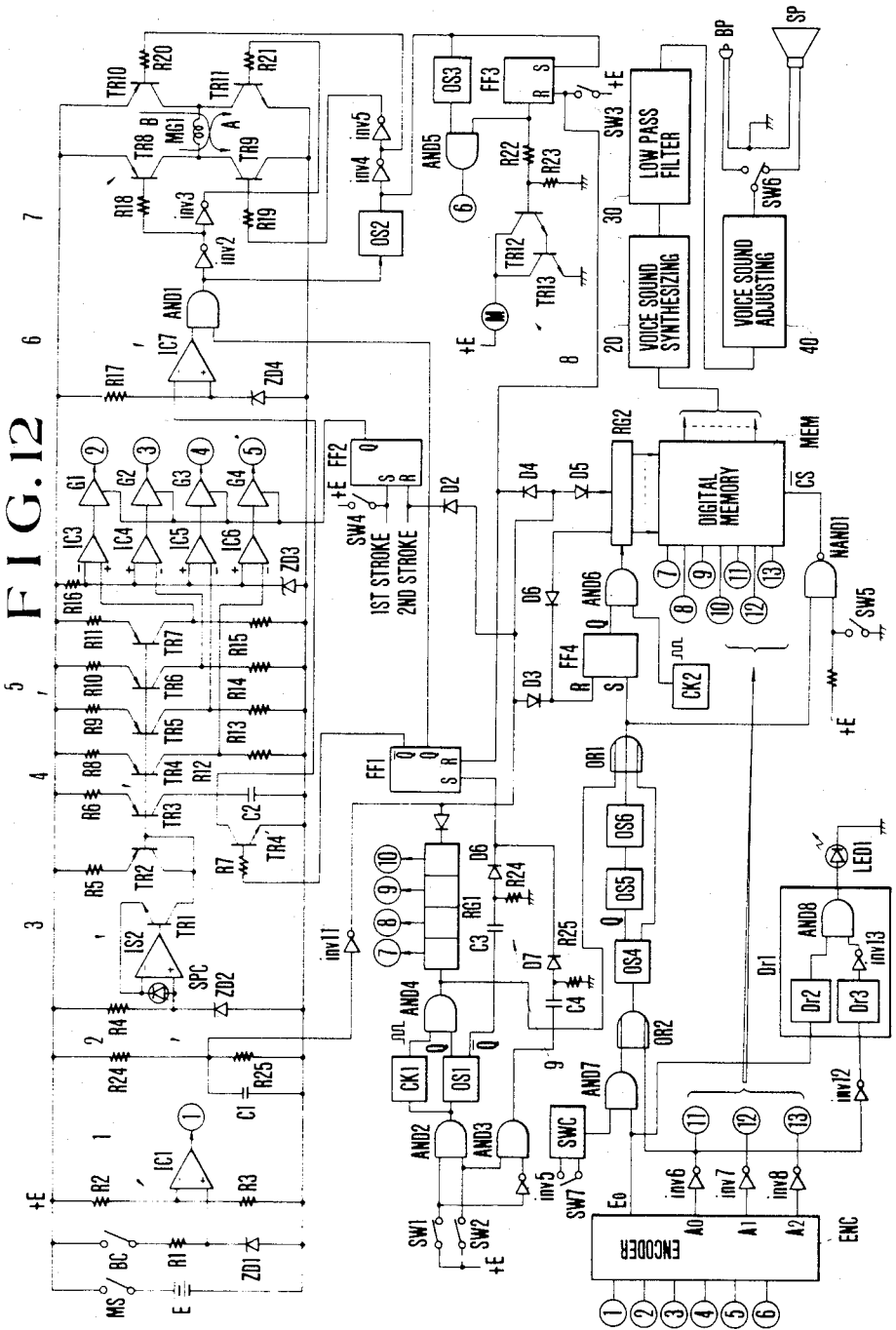
FIG. 12 is a control circuit diagram of a camera having a conversation type voicing device built therein according to another example of the present invention.

FIG. 12 is a circuit diagram to show another example of the present invention, wherein same identifying letters or numbers are used for same components as in FIG. 1. The difference between FIG. 1 and FIG. 12 exists in the driver circuit (Dr1).

A Dr2 in FIG. 12 is a circuit to generate pulses to have the LED 1 for a visual display emit light, and is actuated when the input from the E0 becomes "1" level to generate the pulses. A Dr3 is a pulse generating circuit to determine a flickering cycle of the LED 1 for a visual display, and is actuated when the input becomes "1" level.

While the outputs of the E0, A0, A1, A3 will be determined by the input terminals ① to ⑥ of the encoder (ENC), in a case the output of the inv 6 is "1", that is at a time when the battery voltage is insufficient, or the lens cap is left in place, or there is a trouble in film feeding as in the above-mentioned explanation, the input signals into the Dr3 by an inv 12 is at "0" level as shown in FIG. 13. Therefore, since the Dr3 does not generate the flickering cycle pulses, an output of an inv 13 will be left in "1". Therefore, the LED 1 is lighted by an AND 8. Also in a case of a warning state at a time the output of the inv 6 is "0", that is in a case of the over exposure warning, the hand shaking, or the under exposure warning as in the above-mentioned explanation, the input signals into the Dr3 by the inv 12 will be "1" as shown in FIG. 13. Therefore, the Dr3 generates flickering cycle pulses, and the flickering cycle pulses through the inv 13 make a display with flickered lighting by the LED 1 through the Dr2 and the AND 8.

Also, while a same warning state display by a same LED 1 is made in the example shown in FIG. 1, the warning state display method will be weighed in the example shown in FIG. 12. For example, a lighting of the LED 1 is used as a serious warning while a flickering thereof is used as a light warning, and a "a case of the battery voltage being below the prohibitingly low voltage", "cap being placed over a lens", and "trouble in film feeding" are treated as serious warnings with lighted display and a function of the camera itself is inhibited. Also, "under exposure warning", "over exposure warning", and "hand shaking", etc. are treated as light warnings with flickering display. Thus, it is also possible to make the above-mentioned weighed warnings by varying a brightness of the LED 1 or by using different light emitting diodes.

The present invention with the above-mentioned set up will not have such annoying cases that reporting by voice sounds are made every time a warning or an instruction for a photographing is to be given. In other words, for such warnings which a photographer knows through his or her experience or knowledge (hand shaking, under or over exposure, etc.), there will be no such disturbing experience as persistant warnings by voice. Also, depending a warning state display, a photographer may take a counter action instantly for what he or she knows through experience or knowledge, and a photographer who does not know can find out a way to counter for the information displayed in detail by the external voice sound activating means. In addition, when there is a weighed display in a warning state display, a judgement can be made instantly whether a photo-taking with a preference being placed for a quick photographing can be made or not. In this case a photographer can find out necessary warning or an instruction (a photo-taking procedure) in detail by voices whenever he or she needs the same.

Also the invention has such advantage that in a case a photo-taking action in a camera can not be taken, out of the warnings (for example, "trouble in feeding film" or "cap being in on", etc.), a voice warning will be given unconditionally regardless of a conversation button, while in a case a photo-taking action can be taken (a hand shaking, etc.), there will be no unconditional voice warnings.

What we claim:

1. A camera comprising:

detection means for detecting a plurality of information in the camera, said detection means being arranged for generating signals corresponding to the the plurality of kinds of information;

means for weighting the degrees of importance of the signals corresponding to the plurality of kinds of information from the detection means, said weighting means having first means for producing signals of greater importance and second means to produce signals of lesser importance;

display means for displaying the informations of lesser importance visually in response to the signal from said second means;

sound warning means for producing sound warning of the information of greater importance in response to the signals from the first means;

signal generating means having a switch, said means being arranged for generating a warning signal in response to the switching operation of said switch; and means for causing said sound warning means to produce a sound warning of information of lesser importance in response to the signals from said second means when it receives the warning signal from said signal generating means.

* * * * *